(12) United States Patent
Calloway

(10) Patent No.: US 12,735,861 B2
(45) Date of Patent: Sep. 15, 2026

(54) MATERIAL COLLECTION SYSTEM

(71) Applicant: Old Dominion Brush Company, Henrico, VA (US)

(72) Inventor: Britt R. Calloway, Midlothian, VA (US)

(73) Assignee: Old Dominion Brush Company, Henrico, VA (US)

( * ) Notice: Subject to any disclaimer, the term of this patent is extended or adjusted under 35 U.S.C. 154(b) by 299 days.

(21) Appl. No.: 18/529,469

(22) Filed: Dec. 5, 2023

(65) Prior Publication Data

US 2024/0183125 A1 Jun. 6, 2024

Related U.S. Application Data

(60) Provisional application No. 63/386,139, filed on Dec. 5, 2022.

(51) Int. Cl.
*B62D 55/06* (2006.01)
*E02F 3/88* (2006.01)
*E02F 9/14* (2006.01)

(52) U.S. Cl.
CPC ............ *E02F 3/8816* (2013.01); *B62D 55/06* (2013.01); *E02F 9/14* (2013.01)

(58) Field of Classification Search
CPC .......... E02F 3/8816; E02F 9/14; B62D 55/06; E01H 1/0836; E01H 1/0845; A47L 7/0076
See application file for complete search history.

(56) References Cited

U.S. PATENT DOCUMENTS

| | | | | |
|---|---|---|---|---|
| 2,803,847 | A * | 8/1957 | Hobbs | E01H 1/0836 15/339 |
| 3,541,631 | A * | 11/1970 | Kluge | E01H 1/0836 55/342 |
| 4,218,226 | A * | 8/1980 | Boozer | B01D 45/02 96/414 |
| 4,227,893 | A * | 10/1980 | Shaddock | B60P 1/60 55/315 |
| 5,996,171 | A * | 12/1999 | Bowers | B01D 50/20 15/340.1 |
| 6,523,905 | B2 * | 2/2003 | Tamura | B60K 5/04 180/69.2 |
| 9,604,679 | B2 * | 3/2017 | Steben | B62D 55/06 |
| 9,616,947 | B2 * | 4/2017 | Steben | B62D 55/14 |
| 9,970,167 | B1 * | 5/2018 | Kerckhove | E01H 1/0872 |
| 2002/0030397 | A1 * | 3/2002 | Tamura | B60K 11/04 298/17 R |
| 2010/0252075 | A1 * | 10/2010 | Crockett | E01H 1/0836 15/340.1 |
| 2014/0174839 | A1 * | 6/2014 | Steben | B62D 55/244 180/9.23 |

OTHER PUBLICATIONS

Prinoth Panther T12 Technical Specifications (Year: 2021).*

* cited by examiner

*Primary Examiner* — Eldon T Brockman
(74) *Attorney, Agent, or Firm* — Sterne, Kessler, Goldstein & Fox P.L.L.C.

(57) ABSTRACT

The present disclosure provides a material collection system. The material collection system includes a conduit, a vacuum generator coupled to the conduit, an engine powering the vacuum generator, and a container mounted to a chassis of a vehicle. The vacuum generator generates airflow for drawing material into a material inlet of the conduit. The container receives collected material from the conduit.

20 Claims, 11 Drawing Sheets

MATERIAL COLLECTION SYSTEM

CROSS-REFERENCE TO RELATED APPLICATION

This application claims the benefit of provisional application 63/386,139, filed on Dec. 5, 2022, the disclosures of which are hereby incorporated in its entirety by reference.

FIELD

The present disclosure generally relates to a material collection system. In particular, aspects relate to a material collection system mounted to a tracked carrier.

BACKGROUND

Material collection systems can be used to intake a variety of debris for removal and disposal. Some material collection systems can include additional functionality such as cleaning, sweeping, and excavation. Material collection systems are usually fixed to a wheeled vehicle or a trailer pulled by a wheeled vehicle.

However, a wheeled vehicle has limited mobility when operated off-road, such as in a landfill site, or in severe conditions, such as wet or snow conditions. The limited mobility of the wheeled vehicle can limit the reach and usage of the material collection system it carries.

BRIEF SUMMARY

Some aspects of the invention provide a material collection system including a tracked carrier, a conduit having a material inlet, a vacuum generator having a fan to develop an airflow and draw material into the material inlet of the conduit, a material collection container to receive the material drawn from the conduit, a boom supporting the conduit and moveable between a stowed position and an operational position, and a control system. The tracked carrier includes a chassis having a first lateral side and a second lateral side, a power source disposed on the chassis, and two track frames coupled to the chassis on the first lateral side and the second lateral side. Each track frame include a driving wheel, a idling wheel, a support wheel disposed between the driving wheel and the idling wheel, and an endless track.

In some aspects, the power source is an electric power unit.

In some aspects, material collection system further includes a hook-lift frame removably mounted to the chassis of the tracked carrier. The hook-lift frame includes a base configured to be removably mounted to the chassis of the tracked carrier and a platform rotatably coupled to the base. The vacuum generator and the material collection container are received on the platform.

In some aspects, the hook-lift frame includes a frame hydraulic actuator operatively connected to the base and the platform and configured to pivot the platform between a loading position and an unloading position.

In some aspects, a gross vehicle weight rating of the tracked carrier and the material collection is approximately 7,800 lbs.

In some aspects, the vacuum generator is coupled to the power source via a power take-off, such that the power source is configured to power the vacuum generator.

BRIEF DESCRIPTION OF THE FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
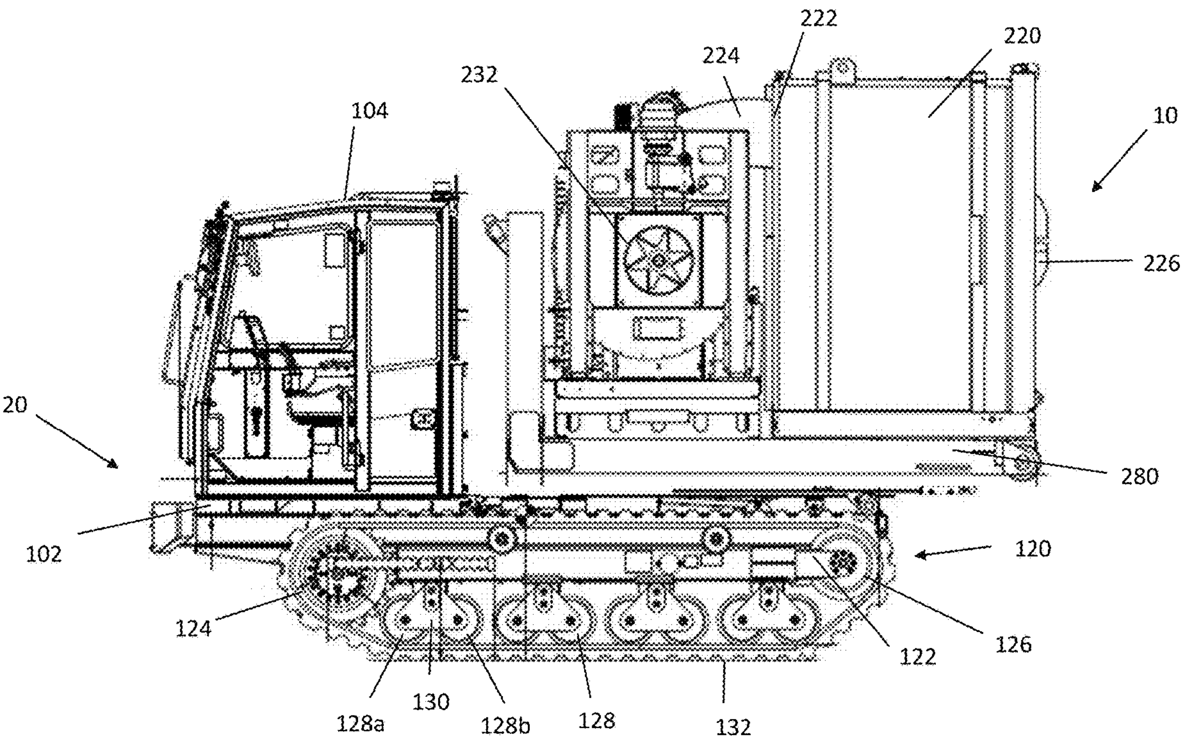
FIG. 1 is a side view of a material collection system mounted on a tracked carrier according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Aspects of the present disclosure are described in detail with reference to aspects thereof as illustrated in the accompanying drawings. References to "one aspect," "an aspect," "an exemplary aspect," etc., indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

Material collection systems use several components, such as extension hoses, engine-powered pneumatic pumps, and large containers to collect material from a pickup site. Due to the size and weight of such equipment, material collection systems can be fixed to the chassis of wheeled vehicles or trailers pulled by wheeled vehicles, such as traditional trucks, to provide proper support for the equipment.

While wheeled vehicles are adapted to traveling on improved roads, they have limited mobility when operated off-road, such as rocky piles, dirt piles, water barriers, or conditions created by severe weather, such as blizzard and snow. Wheeled vehicles have restricted freedom of movement on off-road conditions mainly due to the high ground pressure imparted by the wheels onto the soil. Additionally, wheeled vehicles have difficulties traveling up steep slopes due to their relatively high center of gravity.

However, there is a need in bringing material collection systems to off-road environments, exactly because they are less accessible by traditional wheeled vehicles. Specifically, there is a need for material collection systems in landfill sites for collecting escaped waste because landfill sites operate under a waste permit that requires them to contain the waste. The Environmental Protection Agency (EPA) conducts landfill site inspections that include a waste containment assessment, and if the waste leaves the landfill site, the EPA may issue citations to the landfill site or even suspend the waste permit. Therefore, if unable to utilize a material collection system at the landfill site, the owner would need to hire labor, for example, after a wind event to pick up the fugitive trash.

Accordingly, aspects of the present disclosure provide a material collection system mountable on a tracked carrier. A tracked carrier is more adapted to travelling on multiple types of off-road terrains, comparing to traditional wheeled vehicles, so it can easily maneuver through the space of a landfill site to collect any fugitive trash from areas not immediately adjacent to improved roads and prevent the landfill site from contaminating neighboring environments. A material collection system mountable on a tracked carrier therefore provides a more efficient way of collecting fugitive trash from a landfill site and can reduce labor costs.

In some aspects, a material collection system mounted on a tracked carrier is a stand-alone system with its own power source (e.g. an auxiliary engine) and hydraulic system. When the stand-alone material collection system is mounted onto the tracked carrier, it is connected only to the control system of the tracked carrier, such that the material collection system can be easily mounted or removed to the tracked carrier and is adaptable to various models of the tracked carrier.

In some aspects, a material collection system mounted on a tracked carrier shares the power source with the tracked carrier. A power divider splits the power output from the power source between the tracked carrier and the material collection system. The control system of the tracked carrier and the control system of the material collection system have minimum interlocks to ensure a streamlined installation and operation of the material collection system.

In some aspects, a material collection system mounted on a tracked carrier has a lower center of gravity, such that the tracked carrier is less likely to tip over, thereby allowing better performance on sloped ground. Also in some aspects, a tracked carrier can achieve a smaller turn radius, which enhances the maneuverability of the material collection system in all directions.

In some aspects, the material collection system can include a conduit having a material inlet, a boom supporting the conduit, a vacuum generator configured to generate airflow for drawing material into the material inlet, an auxiliary engine configured to power the vacuum generator, and a material collection container to receive the collected material from the conduit. In some aspects, the material collection system does not have an auxiliary engine, but draws power from the power source of the tracked carrier through a power divider.

In some aspects, the conduit, the vacuum generator, and the material collection container can be supported on a hook-lift frame, and the hook-lift frame can be configured to move the conduit, the vacuum generator, and the material collection container on and off the frame of the tracked vehicle.

Figure 2:
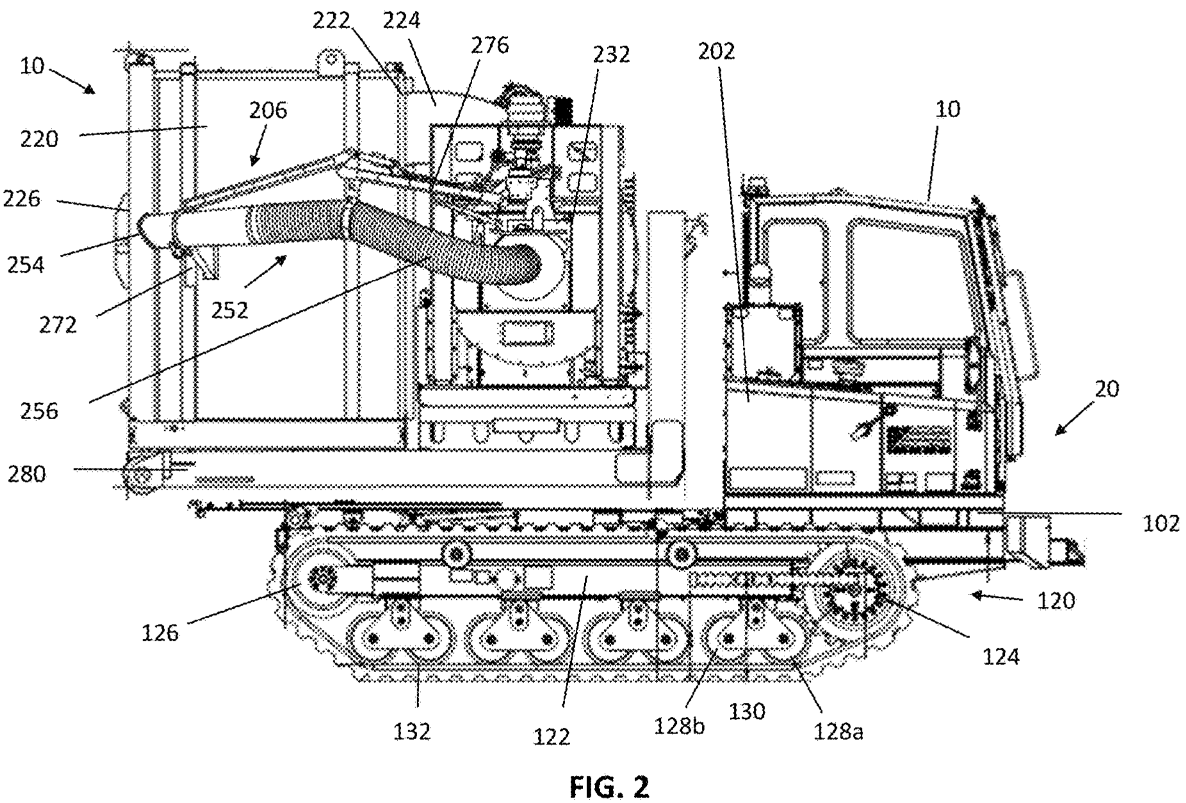
FIG. 2 is a side view of a material collection system mounted on a tracked carrier according to various aspects.
Figure 3:
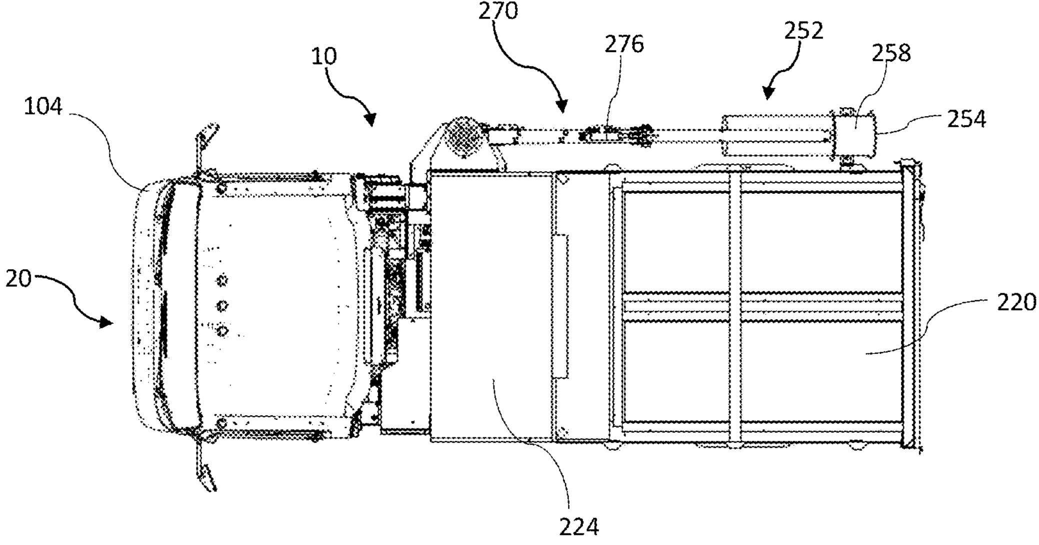
FIG. 3 is a top view of a material collection system mounted on a tracked carrier according to various aspects.
Figure 4:
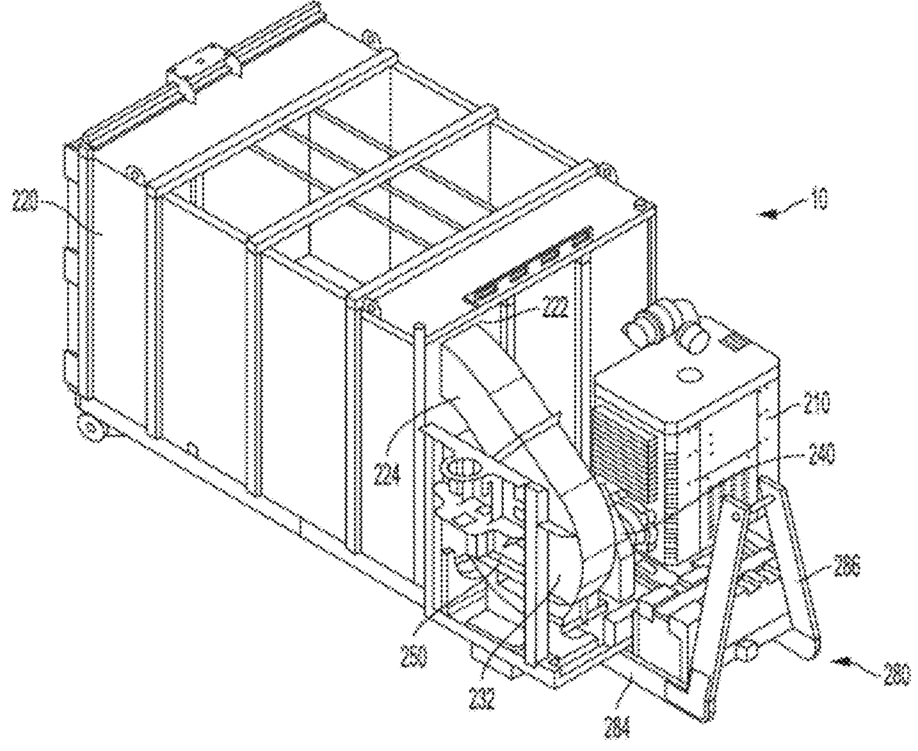
FIG. 4 is a perspective view of a material collection system (conduit and boom are omitted) according to various aspects.

Aspects will now be described in more detail with reference to the figures. With reference to FIGS. 1-3, in some aspects, a material collection system 10 can be mounted to a tracked carrier 20. Tracked carrier 20 can include components, such as a chassis 102 and/or a cab 104 mounted on chassis 102. In some aspects, material collection system 10 and tracked carrier 20 can have a GVWR in a range of approximately 5,000 lbs. to approximately 10,000 lbs, such as in a range of approximately 7,000 lbs. to approximately 8,000 lbs., such as approximately 7,800 lbs. In another aspect, material collection system 10 and tracked carrier 20 can have a GVWR in a range of approximately 5,000 lbs. to approximately 30,000 lbs. Maintaining the GVWR of material collection system 10 and tracked carrier 20 in this manner can allow for a swift operation on the landfill site.

In some aspects, tracked carrier 20 can include a power source 202. In some aspects, power source 202 can be an internal combustion engine 204. In some aspects, power source 202 can be an electric motor powered by a battery hybrid or battery system. In some aspects, power source 202 can propel the movement of tracked carrier 20. In some aspects, power source 202 can also power components of material collection system 10. In some aspects, when material collection system 10 is mounted on tracked carrier 20, a power divider, such as a power takeoff 216 (FIG. 8) can divide power between power source 202 and material collection system 10, to propel the components of material collection system 10.

In some aspects, tracked carrier 20 can include a pair of track assemblies 120 mounted to the two lateral sides of chassis 102. In some aspects, each track assembly 120 can include a track frame 122, and a drive wheel 124, an idling wheel 126, and support wheels 128 mounted on track frame 122. In some aspects, drive wheel 124 is driven by power source 202 through a transmission and disposed on the front side of track frame 122. In some aspects, idling wheel 126 is not driven by power source 202 and is disposed on the rear side of track frame 122. In some aspects, support wheels 128 are disposed between drive wheel 124 and idling wheel 126. In some aspects, support wheels 128 are pairs of support wheels 128 (e.g., support wheels 128*a* and 128*b*) connected by a bogie connection 130.

In some aspects, track assemblies 120 further includes an endless track 132 wrapped around drive wheel 124, idling wheel 126, and support wheels 128. Drive wheel 124 drives endless track 22 to engage the ground to provide traction that moves tracked carrier 20 forward, and support wheels 128 support endless track 22 to maintain a ground contact surface. The ground contacting surface of endless track 132 (e.g. the bottom half of endless track 132) is larger than the ground contacting surface of a traditional wheeled vehicle. Therefore, the resultant ground pressure of tracked carrier 20 is less than that of a traditional wheeled vehicle. In some aspects, when loaded, tracked carrier 20 has a ground pressure in a range of approximately 4.5 psi to approximately 6 psi, such as approximately 5.3 psi. In some aspects, when loaded, tracked carrier 20 has a ground pressure in a range of approximately 2.5 psi to approximately 4 psi, such as approximately 2.3 psi. The lower ground pressure compared to a vehicle with tires can improve the mobility of tracked carrier 20 on off-road conditions. The lower ground pressure can also improve the performance of tracked carrier 20 maneuvering over obstacles and sloped ground.

Material collection system 10 can include a number of components, such as, a container 220, a vacuum generator 232, a conduit 252, a boom 270, and/or a hook-lift frame 280. In some aspects, container 220 can be enclosed to receive and retain the material and debris within its interior area. In an aspect, vacuum generator 232 can be powered by power source 202. In additional aspects, material collection system 10 can also include an auxiliary engine 210. Auxiliary engine 210 can be an internal combustion engine containing its own fuel or an electric motor powered by a battery hybrid or battery system. In some aspects, auxiliary engine 210 provides all necessary power for material collection system 10, such that material collection system 10 is a stand-alone system and does not require split power from power source 202. In some aspects, auxiliary engine 210 works together with power source 202 to provide additional power for material collection system 10.

In some aspects, any one of container 220, vacuum generator 232, conduit 252, boom 270, and/or auxiliary engine 210 can be supported on hook-lift frame 280 to load components of material collection system 10 on chassis 102 of tracked carrier 20 and unload components of material collection system 10 from chassis 102 of tracked carrier 20. In another aspect, any one of container 220, vacuum generator 232, conduit 252, boom 270, and/or auxiliary engine 210 can be supported on chassis 102 of tracked carrier 20.

In some aspects, when material collection system 10 is mounted to tracked carrier 20, material collection system 10 communicates with tracked carrier 20 via control area network (CAN) messaging. In some aspects, material collection system 10 is connected to tracked carrier 20 through two wire connectors. In some aspects, material collection system 10 is connected to tracked carrier 20 through a minimum number of physical and/or software connections. The control system of material collection system 10 and tracked carrier 20 is discussed in detail later in the disclosure.

In some aspects, an operator can reside in cab 104 and operate tracked carrier 20 to travel, for example across a landfill site for collecting trash. In some aspects, the operator can reside in cab 104 during a material collection operation and operate the material collection system 10 from inside the cab.

Figure 5:
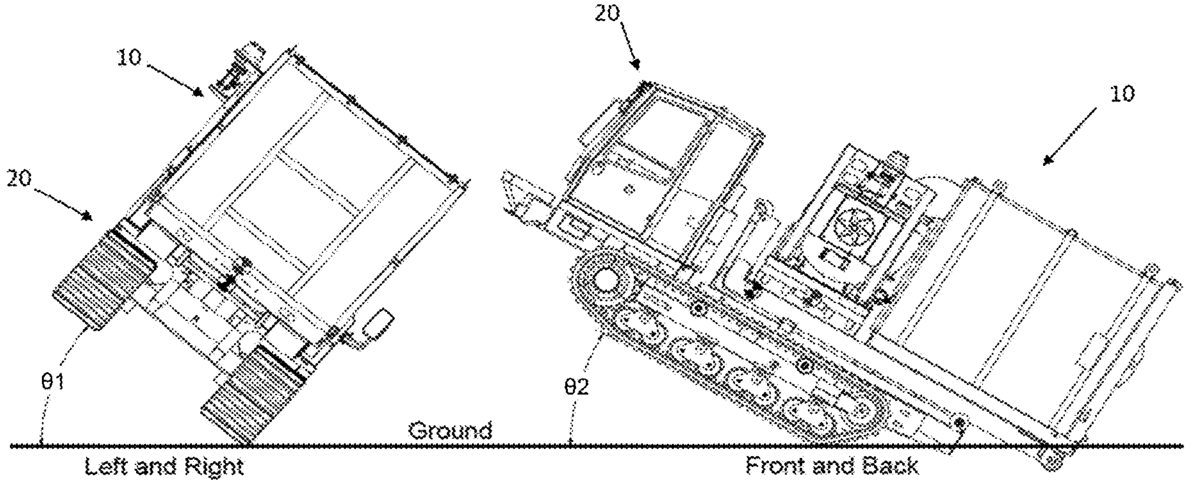
FIG. 5 is a schematic view showing the gradeability of a material collection system mounted on a tracked carrier according to various aspects.

With reference to FIGS. 1, 2, and 5, in some aspects, vacuum generator 232 can be disposed approximate to a front end of container 220 and behind cab 104. In some aspects, vacuum generator 232 can be in fluid communication with conduit 252 and container 220. For example, conduit 252 can be removably coupled to an inlet port 236 of vacuum generator 232. In some aspects, conduit 252 is coupled to vacuum generator 232 on the non-driver side of tracked carrier 20. In some aspects, conduit 252 is coupled to vacuum generator 232 on the driver's side of tracked carrier 20, which can provide better visibility of the collection zone.

In some aspects, vacuum generator 232 can generate an airflow for drawing material through conduit 252 and duct 224 such that container 220 receives material collected through conduit 252. In some aspects, container 220 can have a duct 224, extending from an inlet of container 220 to an outlet port 238 of vacuum generator 232 to convey collected material from vacuum generator 232 to container 220.

In some aspects, the airflow developed by vacuum generator 232 can retrieve material from the pickup site. For example, the airflow generated by vacuum generator 232 can create a substantial air pressure differential between conduit 252 and the ambient air of the area to draw material into conduit 252. In some aspects, material disposed in the pickup site can be drawn by the airflow through intake end 258 and travel through conduit 252 and vacuum generator 232.

In some aspects, material can be moved through inlet 222 of container 220. In some aspects, container can have an inlet 222 to facilitate intake of material. In some aspects, container 220 can further include an outlet for exhausting the airflow into the ambient environment. In other aspects, airflow can be recirculated to develop a regenerative vacuum in vacuum generator 232. In some aspects, material can be collected in container 220.

In an aspect, container 220 can be sized to permit sufficient collection of material and debris, but to prevent an operator from exceeding a gross vehicle weight of 10,000 lbs. In some aspects, container 220 can define a storage volume in a range of approximately 7 cubic yards to approximately 20 cubic yards, such as approximately 10 cubic yards to approximately 17 cubic yards, such as approximately 14 cubic yards.

By defining a storage volume of container 220 between approximately 7 cubic yards and approximately 18 cubic yards, container 220 can include sufficient storage capacity to hold substantial loads of collected material and debris without exceeding a gross vehicle weight of 10,000 lbs. Further, material collection system 10 can include dimensions (e.g., width, height, length) that allow tracked carrier 20 to have smaller dimensions for swift operation. For example, in some aspects, material collection system 10 can include a length in a range of approximately 12 feet to approximately 16 feet, such as a length of approximately 14 feet. And in some aspects, material collection system 10 can include a width in a range of approximately 7 feet to approximately 12 feet, such as a width of approximately 9.5 feet. And in some aspects, material collection system 10 can include a height in a range of approximately 10 feet to approximately 15 feet, such as a height of approximately 12.5 feet.

In some aspects, by defining storage volume of container 220 and the dimensions of material collection system 10, the system of material collection system 10 and tracked carrier 20 can have a lower center of gravity, which enables the system to maneuver over steep slopes without the risk of tipping over. With reference to FIG. 5, in some aspects, when container 220 is unloaded, the maximum tilting angle from left to right θ1 without tipping over is in a range of approximately 40 degrees to approximately 55 degrees, such as approximately 48 degrees; and/or the maximum tilting angle from front to back θ2 without tipping over is in a range of approximately 50 degrees to approximately 65 degrees, such as approximately 58 degrees. In some aspects, when container 220 is loaded with approximately 7,000 lbs, the maximum tilting angle from left to right θ1 without tipping over is in a range of approximately 35 degrees to approximately 45 degrees, such as approximately 40 degrees, and/or the maximum tilting angle from front to back θ2 without tipping over is in a range of approximately 25 degrees to approximately 35 degrees, such as approximately 30 degrees.

In some aspects, container 220 can be configured to facilitate quick and efficient removal of collected material held in container 220. For example, container 220 can include dump doors 226 disposed at a back end of container 220. Dump doors 226 can include hinges pivotably coupling a top of the dump doors with a body of container 220. By locating hinges at top of the dump doors of container 220, dump doors 226 pivot upward to empty collected material out of container 220. In some aspects, container 220 can include a blower disposed in the container 220 and proximate to the dump doors. The blower can be configured to generate an air stream for propelling collected material out of container 220.

In some aspects, vacuum generator 232 can include a motor 240 configured to drive vacuum generator 232. In some aspects, motor 240 can be an electrical motor powered by power source 202 or an auxiliary engine 210.

Figure 6:
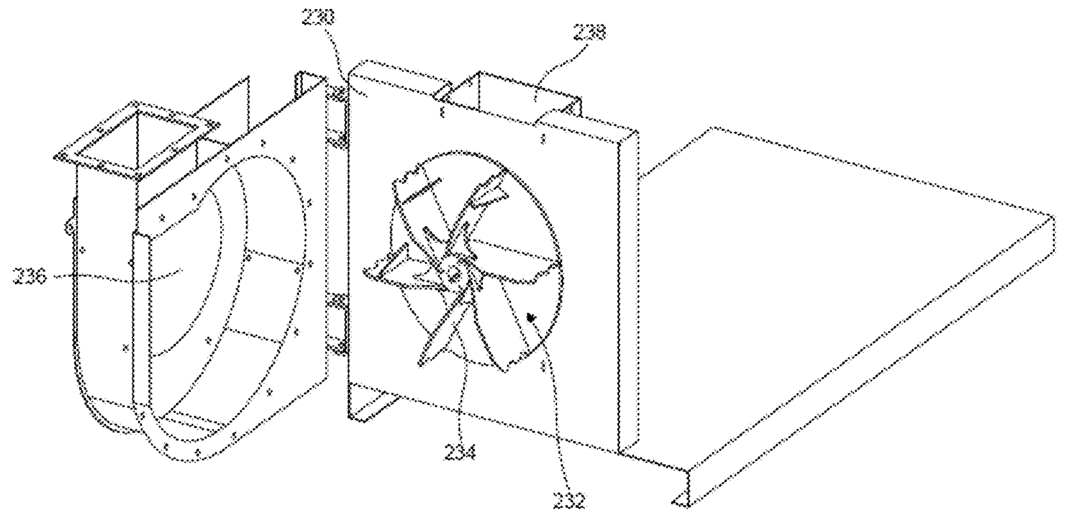
FIG. 6 is a perspective view of a vacuum generator according to various aspects.

With reference to FIG. 6, in some aspects, vacuum generator 232 can be, for example, a fan, such as centrifugal fan or an axial fan. In some aspects, the fan of vacuum generator 232 can include a propeller having a plurality of blades 234 that can rotate when powered to develop a sub-atmospheric pressure airflow. The blades can also chop incoming material into small pieces as the material passes the blades. In some aspects, the propeller can include a diameter in a range between approximately 18 inches and approximately 34 inches. In some aspects, the propeller can include a diameter of approximately 20 inches. In other aspect, the propeller can include a dimeter in a range of approximately 28 inches to approximately 32 inches. In some aspects, the fan of vacuum generator 232 can generate a volumetric flow rate in a range of approximately 15,000 CFM to approximately 35,000 CFM, such as approximately 18,000 CFM to approximately 25,000 CFM.

In some aspects, vacuum generator 232 can include a housing 230 partially enclosing the fan. In some aspects, housing 230 can include the outlet port 238 connected to container 220 via duct 224. In some aspects, housing 230 can include inlet port 236 for receiving an outlet end of conduit 252. In some aspects, housing 230 can be pivotably coupled to a frame by a hinge such that housing 230 can be pivoted to provide access to the propeller for servicing.

In some aspects, conduit 252 can extend away from vacuum generator 232 and terminate at intake end 258. In some aspects, conduit 252 can be comprised of a flexible material (e.g., elastic material) so that the conduit 252 can be bent or flexed to adjust the position of intake end 258 to a variety of positions around the pickup site surrounding tracked carrier 20. In some aspects, conduit 252 can include an interior wall 254 and/or an exterior wall 256. In some aspects, interior wall 254 can be configured to support the airflow through conduit 252. For example, interior wall 254 can be smooth and free of obstructions. In some aspects, one or more sections of interior wall 254 and/or exterior wall 256 can include corrugated plastic. In some aspects, interior wall 254 and/or exterior wall 256 can include plastics, metals, composites, or a combination thereof.

In some aspects, boom 270 can be configured to lift and support conduit 252. In some aspects, boom 270 can be in rack 272 such that boom 270 can be in a storage position. In the storage position, boom 270 can be substantially parallel to chassis 102. In some aspects, conduit 252 can extend outward from tracked carrier 20 such that boom 270 can be in a deployed position.

In some aspects, the amount of conduit 252 that extends from tracked carrier 20 is adjustable such that conduit 252 can extend from tracked carrier 20 more or less, depending on the pickup site. In some aspects, the extension of conduit 252 can be adjusted before or during a material collection operation. In some aspects, conduit 252 can include a length in a range between approximately 6 feet and approximately 12 feet, such that the length of conduit 252 provides a sufficient range of reach to collect material around tracked carrier 20, while minimizing weight. In some aspects, conduit 252 can include a diameter in a range between approximately 10 inches and approximately 16 inches, such that the power source 202 or auxiliary engine 210 can operate effectively with less power capacity to generate sufficient suction force within conduit 252 to collect material.

In some aspects, boom 270 can be moved (e.g., by one or more hydraulic actuators) from a lower position (e.g., a position substantially parallel to chassis 102), to a higher position (e.g., a position at an angle relative to chassis 102). In an aspect, the lower position can be storage position and the higher position can be deployed position. In other aspects, boom 270 can control movement of conduit 252 (e.g., by one or more hydraulic actuators 276) such that the position of intake end 248 can be adjusted in longitudinal direction, a lateral direction, and/or a vertical direction. In some aspects, the combination of moveable boom 270 and conduit 252 can provide flexible positioning of intake end 248 at pickup sites.

In some aspects, material collection system 10 can pick up and remove material from a pickup site of various composition and/or sizes. For example, the material can be natural debris (e.g., leaves, branches, or dirt), recyclables (e.g., plastics, metals, or papers), and/or waste (e.g., food waste or non-recyclables). Debris, such as natural debris, can further include particulate matter (i.e., matter suspended in air). In some aspects, conduit 252 and container 220 can be configured to intake and contain a plurality of different types of materials, respectively. Intake end 258 can include a plurality of attachments to enable intake of a plurality of materials. For example, intake end 258 can include a cutting attachment (not shown) configured to cut, for example, wet leaves and/or plastic waste so that the material can be collected by material collection system 10. Thus, while the cross-sectional area of conduit 252 and intake end 248 can be fixed in some aspects, material collection system 10 is capable of receiving larger sized material and material of different shapes.

In other aspects, intake end 258 can include material for engagement with a plurality of materials. For example, material can include rigid materials such as rocks which can damage material collection system 10 and/or tracked carrier 20. Intake end 258 can contain metal (e.g., steel) such that intake end 258 retains its structure when engaging with certain materials. This aspect can be included for certain applications, such as excavation (i.e., breakage of material for collection and disposal). In some aspects, a broom attachment (not shown) configured to sweep a surface can attach to intake end 258 and/or another part of material collection system 10. The broom attachment can be used for collection of material for intake. In some aspects, airflow can be recirculated within the broom attachment to contain particulate matter. In some aspects, intake end 258 of conduit 252 can include a rigid nozzle integrated with boom 270. In some aspects, the rigid nozzle of intake end 258 can be welded to boom 270. The rigid nozzle of intake end 258 allows for more precise control over the motion of intake end 258, which is well suited for material collection system 10 operating in more restrictive environments. In contrast, prior art debris collector nozzle designs typically include a sheet metal tube that hangs from a boom via a chain or a rigid link. While such prior art designs allow the nozzle to be flexible, the flexibility of prior art nozzles typically cannot be controlled precisely such that prior art nozzles are prone to swinging. If there is a wet pile of leaves, or leaves with large sticks, then the nozzle's inertia can be used to break up the sticks. However, the rigid nozzle of intake end 258 provides more precise control of movement compared to prior art nozzles, thereby allowing material collection system 10 to operate in more restrictive environments.

In some aspects, particulate matter such as leaf dust can require additional processing for containment in container 220. Containment of particulate matter can prevent it from exhausting through outlet and returning to the environment. Exhausting particulate matter can be undesirable as it can return material to the environment and can impair nearby operators (e.g., operators can breathe in particulates or hurt their eyesight). Leaf material, for example, can include dry leaves and/or wet leaves. Leaves, because of their weight, can be directed downward through container 220. However, dry leaves can include leaf dust which cannot be similarly directed downward. In some aspects, material collection system 10 can further include a water system (not shown), such as a water tank, a water pump, and/or a water line.

Figure 7:
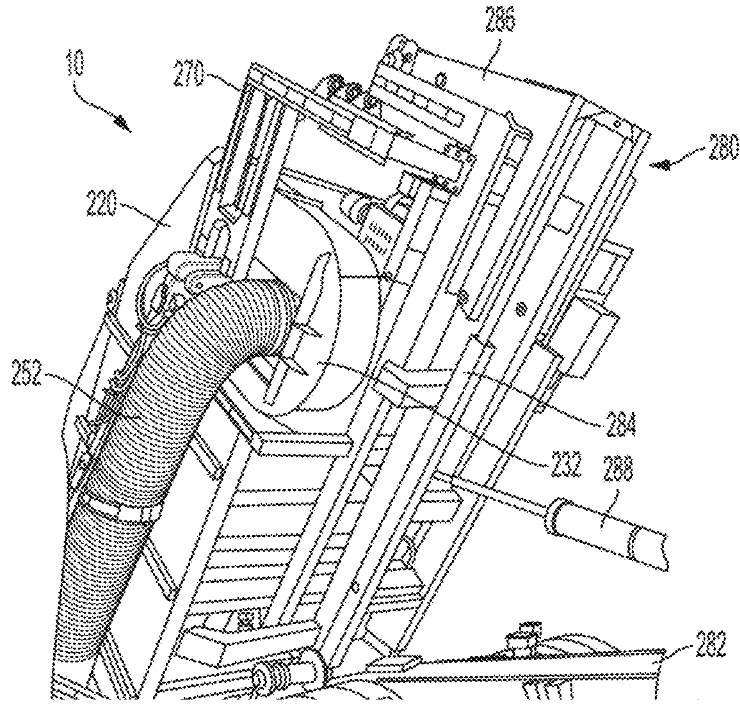
FIG. 7 is a perspective view of a material collection system mounted on a tracked carrier according to various aspects.

With reference to FIG. 7, in some aspects, any one of container 220, vacuum generator 232, conduit 252, boom 270, and/or auxiliary engine 210 can be supported on hook-lift frame 280 to move components of material collection system 10 on and off chassis 102 of tracked carrier 20. In some aspects, hook-lift frame 280 can include a base 282 configured to be removably mounted on the chassis 102 of tracked carrier 20. In some aspects, base 282 can be mounted to chassis 102 using any suitable fastener, such as, for example, bolts, rivets, brackets, clamps, etc. In some aspects, hook-lift frame 280 can include a platform 284 rotatably coupled to base 282. In some aspects, platform 284 can include a post 286 (e.g., pair of angled tubes) projecting from a front end of platform 284. In some aspects, a back end of platform 284 can be connected to base 282 by a joint (e.g., hinge, pin) such that platform 284 can pivot about the joint to move between a loading position and an unloading position. In some aspects, vacuum generator 232, a component of power source 202 (e.g., auxiliary engine 210, hydraulic motor pump, etc.), container 220, conduit 252, and/or boom 270 can be received on the platform 284.

In some aspects, hook-lift frame 280 can include a frame hydraulic actuator 288 operatively connected to base 282 and platform 284. In some aspects, frame hydraulic actuator 288 can be configured to pivot platform 284 between a loading position and an unloading positon. At the loading position, platform 284 can extend substantially parallel with respect to base 282 and chassis 102 of tracked carrier 20. At the unloading position, platform 284 can be tilted with respect to base 282 and chassis 102 of tracked carrier 20 so that components of material collection system 10 can be moved on and off chassis 102.

Figure 8:
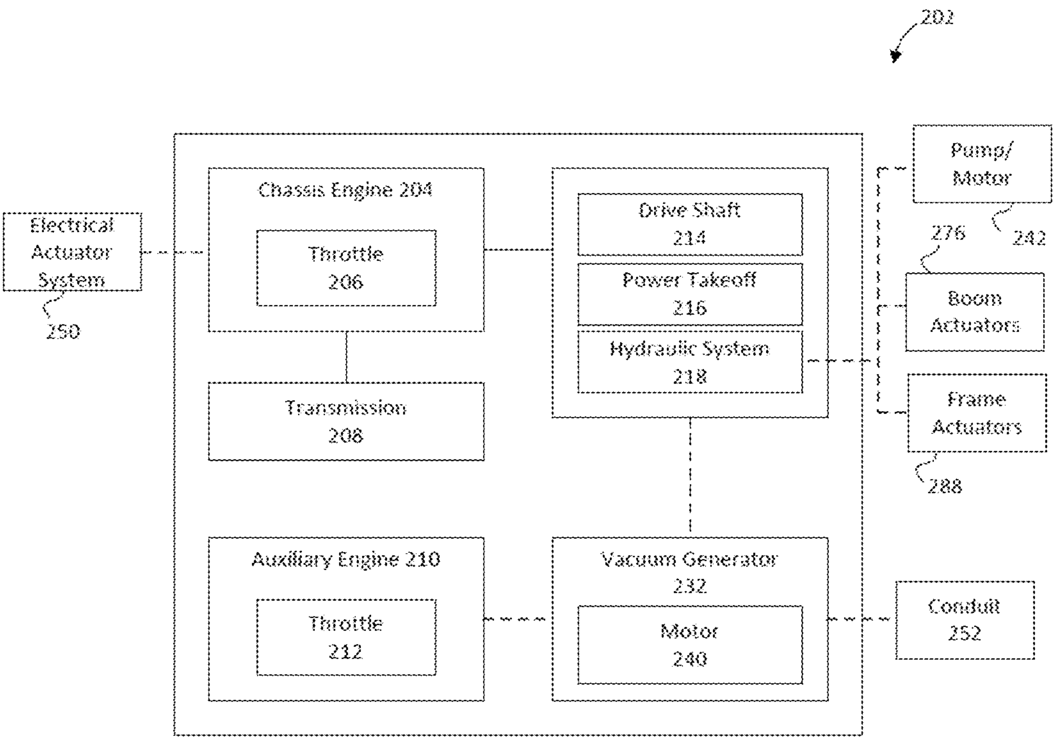
FIG. 8 is a block diagram of a power source for a material collection system mounted on a tracked carrier according to various aspects.

In some aspects, power source 202 can provide power to various components of material collection system 10. For example, power source 202 can power vacuum generator 232. With reference to FIG. 8, in some aspects, power source 202 can include chassis engine 204, a throttle 206, a transmission 208, an auxiliary engine 210, a throttle 212, a drive shaft 214, power takeoff(s) 216, and/or a hydraulic system 218. In some aspects, power source 202 can power material collection equipment, such as vacuum generator 232. In some aspects, hydraulic system 218 can be operatively connected to boom 270 to adjust the position of conduit 252 or connected to frame actuator 288 to adjust the position of hook-lift frame 280 to load and unload other components of material collection system 10 on chassis 102 of tracked carrier 20.

In some aspects, power source 202 can provide motive power to tracked carrier 20. For example, power source 202 can include a chassis engine 204 (i.e., a primary engine powering tracked carrier 20) that moves tracked carrier 20. In some aspects, chassis engine 204 can be an internal combustion engine. In another aspect, chassis engine 204 can include an electric motor powered by a battery source. In one aspect, power source 202 can include any components of the vehicle's electrical system, such as a direct current (DC) power unit. In some aspects, chassis engine 204 can provide power to drive vacuum generator 232 and/or other material collection system 10 equipment. Chassis engine 204 can, for example, power vacuum generator 232 using drive shaft 214, a power takeoff(s) 216, a hydraulic system 218, or indirectly via a drive belt system (not shown). In some aspects, throttle 206 can control the power output of chassis engine 204.

Figure 9:
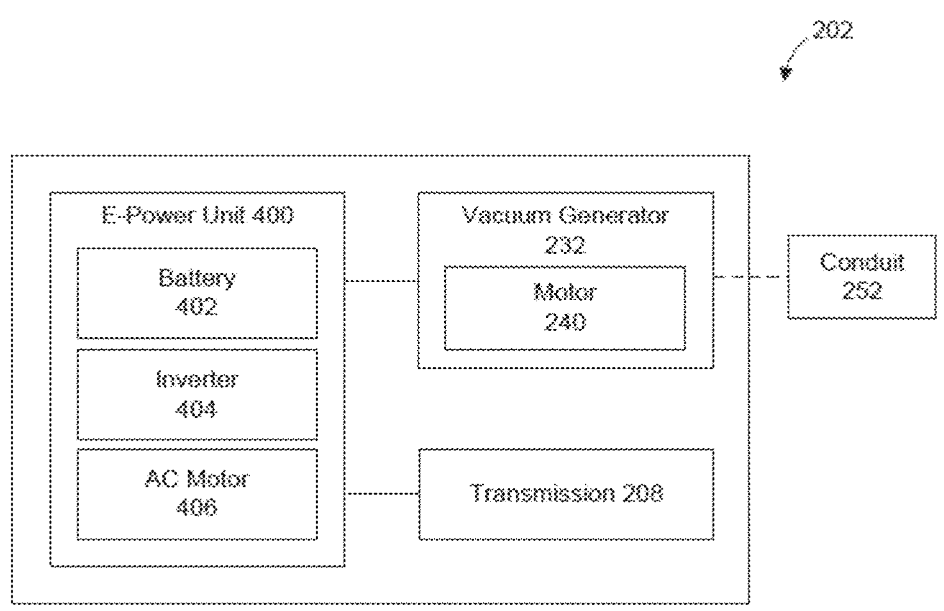
FIG. 9 is a block diagram of an electrical power source for a material collection system mounted on a tracked carrier according to various aspects.

With reference to FIG. 9, in some aspects, power source 202 can include an electric power unit 400. Electric power unit 400 can include a battery 402 (i.e., a DC battery), an electric motor 406 (i.e., an AC motor), and an inverter 404 to convert the DC output of battery 402 into AC input to motor 406. In some aspects, inverter 404 can also control the input to motor 406 and thus the speed of motor 406. In an aspect, battery 402 can be a battery hybrid and can be recharged by a generator onboard material collection system 100. Electric power unit 400 can power vacuum generator 232 and transmission 208 to propel the movement of tracked carrier 20. In an aspect, electric power unit 400 can be the source of power in power source 202, such that its power output is divided by transmission 208 and vacuum generator 232.

In some aspects, material collection system 10 and tracked carrier 20 can include a control system 300 (FIG. 10) having a controller operatively linked (e.g., wired connection or wireless connection) to any component of power source 202. For example control system 300 can control throttle 206 to adjust power output of chassis engine 204. Control system 300 can control throttle 212 to adjust power output of auxiliary engine 210, if one exists. Control system 300 can control drive shaft 214 and power takeoff 216 to control power output to hydraulic pump and/or motor 240, 242. By controlling power output of any one of chassis engine 204, auxiliary engine 210, drive shaft 214, and power takeoff 216, control system 300 can control operation of vacuum generator 232 (e.g., adjust speed of fan) and/or hydraulic system 218.

In some aspects, control system 300 can adjust the speed of power source 202 to control the speed of vacuum generator 232. For example, vacuum generator 232 can be set at a higher speed, e.g., a work speed, when collecting material, and set at a lower speed, e.g., an idle speed, when not collecting material. In some aspects, the idle speed can correspond to power source 202 being set at approximately 1,200 RPM, or approximately 0 RPM for an electric or hybrid-electric system. In some aspects, the work speed can correspond to power source 202 being set to a range between approximately 2,400 RPM and approximately 3,200 RPM.

In some aspects, control system 300 can include one or more sensors to provide electronic signals indicative of system conditions (e.g., weight of a material collected in container 220). The one or more sensors can include digital and/or analog sensors. In some aspects, the one or more sensors can output amplified and/or unamplified signals. In some aspects, the one or more sensors can be self-contained in its own housing (i.e., they include the sensor and a power source). In some aspects, the one or more sensors can be modular or integrated into a component of material collection system 10. In other aspects, the one or more sensors can be a remote sensor such that power can be provided by a remote power source. In some aspects, the sensors can also use a variety of renewable power sources (e.g., solar power, ambient RF, thermoelectric, etc.) In some aspects, the one or more sensors in material collection system 10 can include a load sensor 340 to detect a load applied by the collected material received in container 220. In some aspects, load sensor 340 can transmit an output signal indicating the load applied by the collected material received in container 220. In some aspects, the one or more sensors in material collection system 10 can include a proximity sensor 342 to detect that vacuum generator 232 is lowered down onto chassis 102 or hook-lift frame 280 before power is connected or that dump door 226 is closed.

In some aspects, control system 300 can be in electrical communication (e.g., wired or wirelessly) with load sensor 340 and proximity sensor 342. In some aspects, control system 300 can receive the output signal transmitted by the sensors, such as load sensor 340 and proximity sensor 342, so that electronic data is input into a processor (e.g., processor 302 shown in FIG. 10) of a controller via an input/output module (e.g., I/O module 322 shown in FIG. 10). In some aspects, control system 300 can use the electronic data received from the sensors to determine a weight of the collected material received in container 220 or to determine whether power can be connected to vacuum generator 232.

Figure 11:
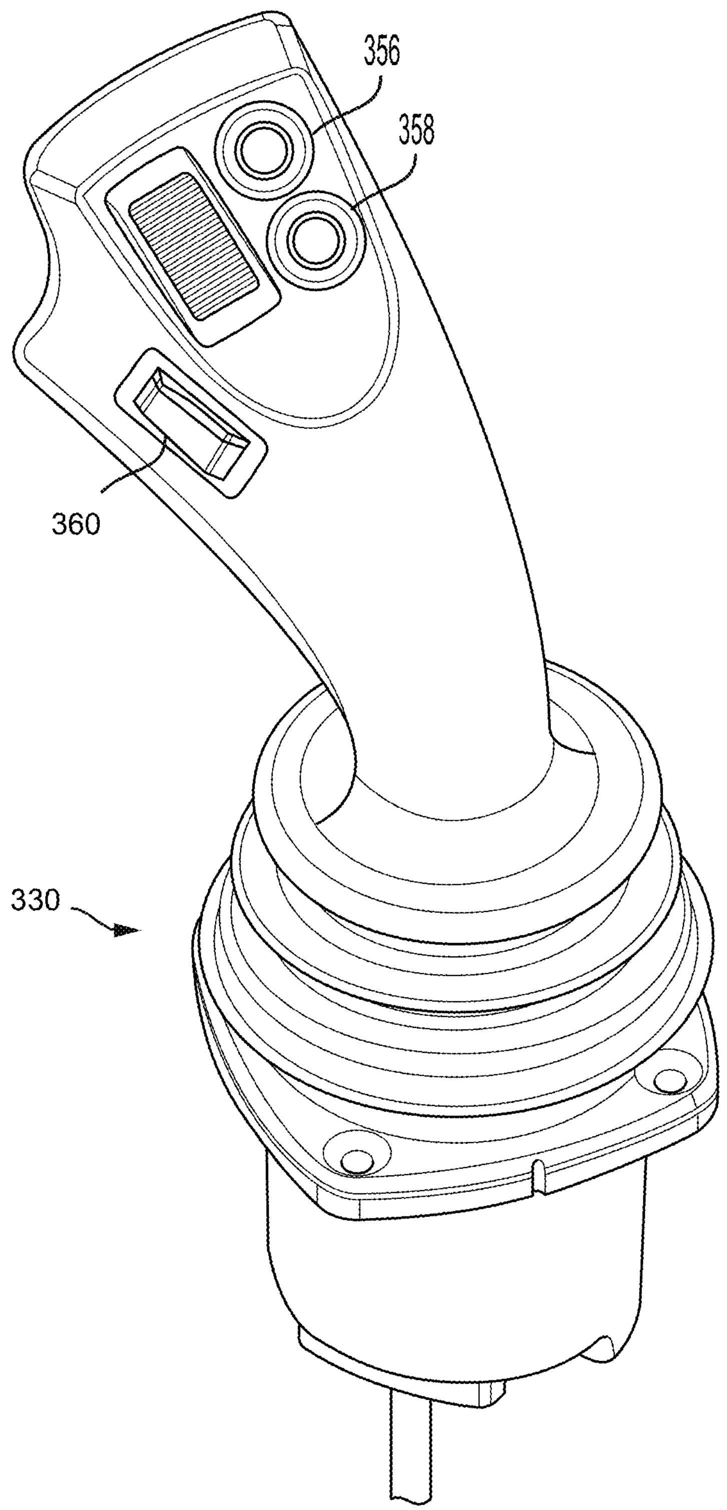
FIG. 11 is a perspective view of a joystick for controlling a material collection system mounted on a tracked carrier according to various aspects.

In some aspects, control system 300 can include a display 332 (e.g., a monitor, a screen) and a control device 330, such as a joystick 334 (as shown in FIG. 11), a touchscreen, a control panel, or other handheld devices. In some aspects, display 332 and control device 330 may be disposed in cab 104 of tracked carrier 20 to be viewed by an operator. In some aspects, display 332 can display information such as the determined aggregate weight of tracked carrier 20, the speed of tracked carrier 20, the working condition of vacuum generator 232, and/or the dump of container 220. In some aspects, display 332 can indicate a warning (e.g., by sound or a LED) to a driver of tracked carrier 20, such as for example, when aggregate weight of tracked carrier 20 exceeds the maximum operating weight, or when vacuum generator 232 is not lowered to chassis 102. In some aspects, display 332 is powered by power source 202.

In some aspects, when material collection system 10 is mounted on tracked carrier, control system 300 communicates with material collection system 10 via CAN ("control area network") messaging. In some aspects, when material collection system 10 is a stand-alone system with auxiliary engine 210 and is received on hook-lift frame 280, the control of hook-lift frame 280 and material collection system 10 can be input via control device 330, such as joystick 334. In some aspects, there are multiple joysticks 334 disposed in cab 104, with each joystick 334 controlling one or more of the travelling of the tracked carrier 20, the operation of vacuum generator 232, and its hydraulic components, the operation of hook-lift frame 280, or auxiliary components of tracked carrier 20. In some aspects, three joysticks are disposed in cab 104, and joysticks 334 can be positioned left to the operator, right to the operator, and/or at a front position ahead of the operator. In some aspects, joystick 334 positioned left to the operator controls the operation of hook-lift frame 280. In some aspects, a single joystick 334 is dedicated to controlling the operation of vacuum generator 232 and the operation of hook-lift frame 280. In some aspects, material collection system 10 connects with tracked carrier 20 through two wire connectors such that the CAN communicates between both display 332 and joystick 334 within cab 102 and material collection system 10 and hook-lift frame 280.

In some aspects, when material collection system 10 does not include auxiliary engine 210 and is powered by a single power source 202 of tracked vehicle 20, power source 202 output can be divided into material collection system 20 via CAN communication. For example, material collection system 10 can send a command for high engine speed when vacuum generator 232 needs to run. In some aspects, the control of material collection system 10 can be input via joystick 334 disposed with cab 102. In some aspects, the control of material collection system 10 and the control of auxiliary components of tracked carrier 20 can be multiplexed within a single joystick 334. For example, when vacuum generator 232 is turned on to intake materials, joystick 334 can control the operation of vacuum generator 232, boom 270, and the hydraulic components. When vacuum generator 232 is turned off, joystick 334 can control the operation of auxiliary components of tracked carrier 20, such as a winch, camera, horn, windshield wipers, or dump hydraulics. In some aspects, the operation of tracked carrier 20, including the auxiliary components, can be controlled by a touchscreen or other control devices 330 disposed in cab 104, regardless of whether vacuum generator 232 is activated.

In some aspects, CAN communications between material collection system 10 and tracked carrier 20 can be simplified with minimum physical and/or control system interlocks to ensure the independency of each system, the ease of setting up the systems, and the minimum modification to of the tracked carrier 20. In some aspects, tracked carrier 20 communicates only two messages with material collection system 10: the RPM of power source 202 and the request to raise and lower container 220 for dumping. In some aspects, material collection system 10 communicates only three messages with tracked carrier 20: the command to set power source 202 at high speed based on feedback from various sensors, the "Go or No Go" confirmation signal for raising and lowering container 220 based on feedback from various sensors, and the signal to shut down power source 202 based on feedback from various sensors.

In some aspects, for example, in order to raise container 220 for dumping, the operator can press and hold a "Dump Raise" button on joystick 334, and a request to raise container 220 is sent to material collection system 10. In some aspects, material collection system 10 checks container/dump interlocks and sends a "Go/No Go" signal accordingly. In some aspects, the latches of dump door 226 on both street side and curb side retract simultaneously, and when both latches are unlocked, material collection system 10 sends a "Go" signal. In some aspect, control system 300 powers the hydraulic components to raise container 220 with a "Go" signal and ceases to power the hydraulic components to with a "No Go" signal. In some aspects, if the operator releases the "Dump Raise" button anytime during the sequence, all motion stops.

In some aspects, for example, in order to lower container 220 for returning from dumping to working condition, the operator can press and hold a "Dump Lower" button on joystick 334, and a request to lower container 220 is sent to material collection system 10. In some aspects, material collection system 10 checks container/dump interlocks and sends a "Go/No Go" signal accordingly. In some aspects, container 202 lowers until proximity sensor 342 detects that container 202 is lowered down to chassis 102, and material collection system 10 sends a "No Go" signal, and control system 300 cease to power the hydraulic components to lower container 220 with a "No Go" signal. In some aspects, when dump door 226 is closed, the latches on both side extend to lock, and when dump door 226 is not closed, a warning message is sent to display 332. In some aspects, if the operator releases the "Dump Lower" button anytime during the sequence, all motion stops.

Additional details regarding material collection system 10 and tracked vehicle 20 are provided in the attached APPENDIX I.

Figure 10:
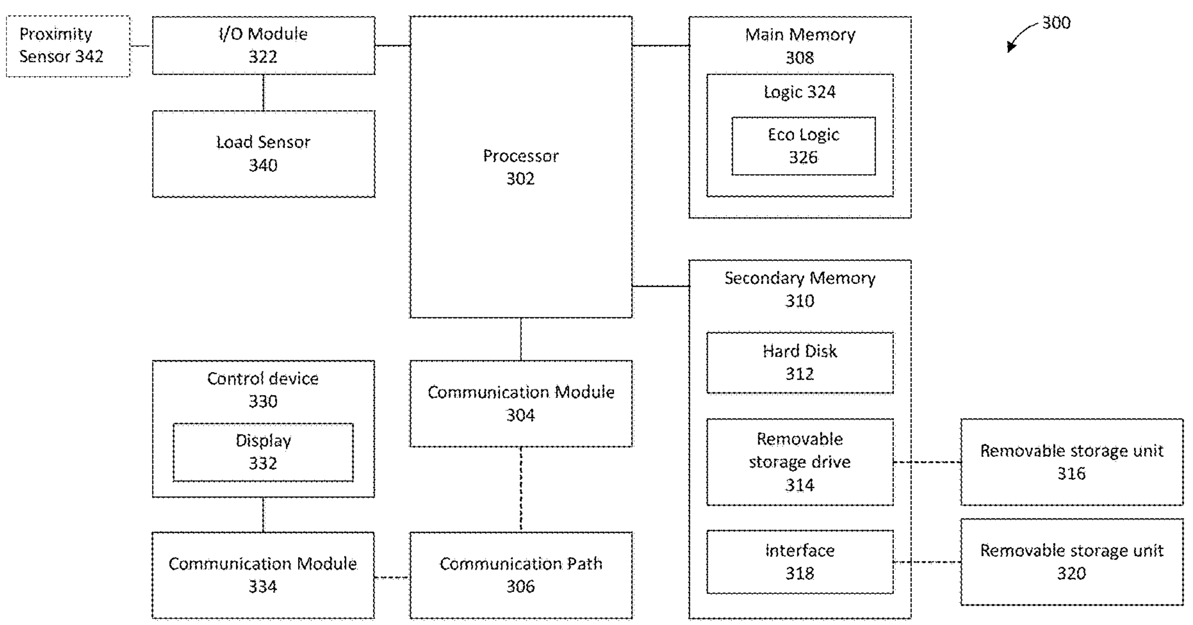
FIG. 10 is a block diagram of a control system for a material collection system mounted on a tracked carrier according to various aspects.

With reference to FIG. 10, in some aspects, control system 300 can be implemented as computer-readable code. For example, processing of operator inputs and field inputs, or control of material collection system 10 components can be implemented using hardware, software, firmware, tangible non-transitory computer readable media having instructions, data structures, program modules, or other data stored thereon, or a combination thereof, and can be implemented in one or more computer systems or other processing systems. Material collection system 10 can include all or some of the components of control system 300 for implementing processes discussed herein.

In some aspects, computer programs (also called computer control logic) such as logic 324 are stored in main memory 308 and/or secondary memory 310. Computer programs can also be received via communication module 304. Such computer programs, when executed, enable control system 300 to implement the aspects as discussed herein. In particular, the computer programs, when executed, enable processor 302 to implement the processes of the aspects discussed here. Where the aspects are implemented using software, the software can be stored in a computer program product and loaded into control system 300 using removable storage drive 314, interface 318, and hard disk drive 312, or communication module 304.

Aspects of the disclosure(s) also can be directed to computer program products comprising software stored on any computer useable medium. Such software, when executed in one or more data processing device, causes a data processing device(s) to operate as described herein. Aspects of the disclosure(s) can employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

In some aspects, if programmable logic is used, such logic can be executed on a commercially available processing platform or a special purpose device. One of ordinary skill in the art can appreciate that aspects of the disclosed subject matter can be practiced with various computer system configurations, including multi-core multiprocessor systems, minicomputers, and mainframe computers, computer linked or clustered with distributed functions, as well as pervasive or miniature computers that can be embedded into virtually any device.

For instance, at least one processor device and a memory can be used to implement the above described aspects. A processor device can be a single processor, a plurality of processors, or combinations thereof. Processor devices can have one or more processor "cores."

Various aspects of the disclosure(s) can be implemented in terms of example control system 300. After reading this description, it will become apparent to a person skilled in the relevant art how to implement one or more of the disclosure(s) using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some aspects the order of operations can be rearranged without departing from the spirit of the disclosed subject matter.

In some aspects, logic 324 can be downloaded to processor 302 and stored in main memory 308 and/or secondary memory 310. Logic 324 can include control logic related to various operational modes and/or various operations of material collection system 10. The operations can be defined using control modules and/or sequences that can run alone, in parallel, or in a phase (i.e., a grouping of sequences). In some aspects, logic 324 can include logic for operational modes including load monitoring mode 326. In some aspects, logic 324 including logic for load monitoring mode 326, is modifiable online and/or offline with access credentials (i.e., developer rights to software).

In some aspects, a processor 302 can be a special purpose or a general purpose processor device. As will be appreciated by persons skilled in the relevant art, processor 302 can also be a single processor in a multi-core/multiprocessor system, such system operating alone, or in a cluster of computing devices operating in a cluster or server farm. Processor 302 can be connected to a communication module 304, for example, a bus, message queue, network, or multi-core message-passing scheme.

In some aspects, control system 300 can include main memory 308, for example, volatile memory, such as random access memory (RAM), or nonvolatile memory, such as read-only memory (ROM). In some aspects, control system 300 can further include a secondary memory 310. Secondary memory 310 can include, for example, a hard disk drive 312, or a removable storage drive 314. Removable storage drive 314 can include a floppy disk drive, a magnetic tape drive, an optical disk drive, a flash memory, or the like. The removable storage drive 314 reads from and/or writes to a removable storage unit 316 in a well-known manner. Removable storage unit 316 can include a floppy disk, magnetic tape, optical disk, a universal serial bus (USB) drive, etc. which is read by and written to by removable storage drive 314. As will be appreciated by persons skilled in the relevant art, removable storage unit 316 can include a computer usable storage medium having stored therein computer software and/or data.

In other aspects, secondary memory 310 can include other similar means for allowing computer programs or other instructions to be loaded into control system 300. Such means can include, for example, removable storage unit 316 and an interface 318. Examples of such means can include a program cartridge and cartridge interface (such as that found in video game devices), a removable memory chip (such as an EPROM, or PROM) and associated socket, and other removable storage units 320 and interfaces 318 which allow software and data to be transferred from the removable storage unit 320 to control system 300.

In some aspects, control system 300 can also include a communication module 304. Communication module 304 can allow software and data to be transferred between control system 300 and external devices. Communication module 304 can include a modem, a network interface (such as an Ethernet card), a communication port, a PCMCIA slot and card, or the like. Software and data transferred via communication module 304 can be in the form of signals, which can be electronic, electromagnetic, optical, or other signals capable of being received by communication module 304. These signals can be provided to communication module 304 via a communication path 306. Communication path 306 can carry signals and can be implemented using wire or cable, fiber optics, a phone line, a cellular phone link, an RF link or other communication channels.

In this document, the terms "computer program medium" and "computer usable medium" are used to generally refer to media such as removable storage unit 316, removable storage unit 320, and a hard disk installed in hard disk drive 312. Computer program medium and computer usable medium can also refer to memories, such as main memory 308 and secondary memory 310, which can be memory semiconductors (e.g., DRAMs, etc.).

Throughout the disclosure, components can be referred to with reference to a material collection system 10, but it will be appreciated that the disclosed systems and methods can be applicable to other aspects as well, and can include additional functionalities (e.g., sweeping, sewer cleaning, contamination removal, excavation, and/or landscaping).

It is to be appreciated that the Detailed Description section, and not the Summary and Abstract sections, is intended to be used to interpret the claims. The Summary and Abstract sections can set forth one or more but not all exemplary aspects of the present aspects as contemplated by the inventor(s), and thus, are not intended to limit the present aspects and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the aspects that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A material collection system, comprising:

a tracked carrier, comprising:

a chassis having a first lateral side and a second lateral side;

a power source disposed on the chassis; and two track frames coupled to the chassis on the first lateral side and the second lateral side, each track frame comprising:

a driving wheel;

an idling wheel;

a support wheel disposed between the driving wheel and the idling wheel; and an endless track;

a conduit having a material inlet;

a vacuum generator, comprising a fan to develop an airflow and draw material into the material inlet of the conduit;

a material collection container to receive the material drawn from the conduit;

a boom supporting the conduit, the boom being movable between a stowed position and an operational position; and a control system, wherein the tracked carrier is configured to communicate to the material collection system an output of the power source and a signal to raise or lower the material collection container, and wherein the material collection system is configured to communicate to the tracked carrier a signal to increase the output of the power source, a signal to turn off the power source, and a signal confirming that the material collection container can be raised or lowered.

2. The material collection system of claim 1, wherein the power source is an electric power unit.

3. The material collection system of claim 1, further comprising a hook-lift frame removably mounted to the chassis of the tracked carrier, the hook-lift frame comprising:

a base configured to be removably mounted to the chassis of the tracked carrier; and a platform rotatably coupled to the base, wherein the vacuum generator and the material collection container are received on the platform.

4. The material collection system of claim 3, wherein the hook-lift frame comprises a frame hydraulic actuator operatively connected to the base and the platform and configured to pivot the platform between a loading position and an unloading position.

5. The material collection system of claim 1, wherein a gross vehicle weight rating of the tracked carrier and the material collection system is approximately 7,800 lbs.

6. The material collection system of claim 1, wherein the vacuum generator is coupled to the power source via a power take-off, such that the power source is configured to power the vacuum generator.

7. The material collection system of claim 1, wherein the tracked carrier has a ground pressure in a range of approximately 4.5 psi to approximately 6 psi.

8. The material collection system of claim 1, comprising:

a length in a range of approximately 12 feet to approximately 16 feet;

a width in a range of approximately 7 feet to approximately 12 feet; and a height in a range of approximately 10 feet to approximately 15 feet.

9. The material collection system of claim 1, wherein the material collection system communicates with the tracked carrier via control area network messaging.

10. The material collection system of claim 9, wherein the material collection system and the tracked carrier are connected through two wire connectors.

11. The material collection system of claim 9, wherein the tracked carrier communicates only two messages with the material collection system, and the material collection system communicates only three messages with the tracked carrier.

12. The material collection system of claim 1, wherein the signal confirming that the material collection container can be raised or lowered is based on feedback from a load sensor configured to detect a load applied to the material collection container and a proximity sensor configured to detect a distance between the material collection container and the chassis of the tracked carrier.

13. A material collection system, comprising:

a tracked carrier, comprising:

a chassis having a first lateral side and a second lateral side;

a power source disposed on the chassis; and two track frames coupled to the chassis on the first lateral side and the second lateral side, each track frame comprising:

a driving wheel;

an idling wheel;

a support wheel disposed between the driving wheel and the idling wheel; and an endless track;

a conduit having a material inlet;

a vacuum generator, comprising a fan to develop an airflow and draw material into the material inlet of the conduit;

a material collection container to receive the material drawn from the conduit;

a boom supporting the conduit, the boom being movable between a stowed position and an operational position;

a load sensor configured to detect a load applied to the material collection container;

a proximity sensor configured to detect that the material collection container is lowered to the chassis of the tracked carrier; and a control system configured to raise or lower the material collection container based on feedback of the load sensor and the proximity sensor, wherein when the material collection container is unloaded, a maximum tilting angle of the material collection system from a lateral side to another lateral side without tipping over is approximately 40 degrees to approximately 55 degrees, and a maximum tilting angle of the material collection system from a front to a back without tipping over is approximately 40 degrees to approximately 55 degrees.

14. The material collection system of claim 13, wherein when the material collection container is loaded with approximately 7,000 lbs, a maximum tilting angle of the material collection system from a lateral side to another lateral side without tipping over is approximately 35 degrees to approximately 45 degrees, and a maximum tilting angle of the material collection system from a front to a back without tipping over is approximately 25 degrees to approximately 35 degrees.

15. The material collection system of claim 13, wherein the power source is an electric power unit.

16. The material collection system of claim 13, further comprising a hook-lift frame removably mounted to the chassis of the tracked carrier, the hook-lift frame comprising:

a base configured to be removably mounted to the chassis of the tracked carrier; and a platform rotatably coupled to the base, wherein the vacuum generator and the material collection container are received on the platform.

17. The material collection system of claim 13, wherein the tracked carrier has a ground pressure in a range of approximately 4.5 psi to approximately 6 psi.

18. The material collection system of claim 13, comprising:

a length in a range of approximately 12 feet to approximately 16 feet;

a width in a range of approximately 7 feet to approximately 12 feet; and a height in a range of approximately 10 feet to approximately 15 feet.

19. The material collection system of claim 13, wherein the material collection system communicates with the tracked carrier via control area network messaging, and the material collection system and the tracked carrier are connected through two wire connectors.

20. The material collection system of claim 19, wherein the tracked carrier communicates only two messages with the material collection system, and the material collection system communicates only three messages with the tracked carrier.

* * * * *